(12) United States Patent
Mukherjee et al.

(10) Patent No.: US 12,141,018 B2
(45) Date of Patent: Nov. 12, 2024

(54) KINETIC POWER CAPPING USING FUZZY LOGIC-BASED DYNAMIC SYSTEM PRIORITIZATION

(71) Applicant: Dell Products L.P., Round Rock, TX (US)

(72) Inventors: Rishi Mukherjee, Bangalore (IN); Shivendra Katiyar, Bangalore (IN); Lori Lynn Matthews, Austin, TX (US); Elie Antoun Jreij, Pflugerville, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 91 days.

(21) Appl. No.: 18/045,884

(22) Filed: Oct. 12, 2022

(65) Prior Publication Data

US 2024/0126360 A1 Apr. 18, 2024

(51) Int. Cl.
| | |
|---|---|
| *G06F 1/26* | (2006.01) |
| *G06F 1/32* | (2019.01) |
| *G06F 1/3296* | (2019.01) |
| *G06F 11/30* | (2006.01) |

(52) U.S. Cl.
CPC ........ *G06F 1/3296* (2013.01); *G06F 11/3062* (2013.01)

(58) Field of Classification Search
CPC .......................... G06F 1/3296; G06F 11/3062
See application file for complete search history.

(56) References Cited

U.S. PATENT DOCUMENTS

| | | | |
|---|---|---|---|
| 10,319,410 B1* | 6/2019 | Townsend | G11B 27/30 |
| 10,331,192 B2* | 6/2019 | Drake | G06F 1/3234 |
| 2012/0054731 A1* | 3/2012 | Aravamudan | G06F 8/63 |
| | | | 717/170 |
| 2013/0226362 A1* | 8/2013 | Jagadishprasad | G06F 1/3203 |
| | | | 700/297 |
| 2017/0285702 A1* | 10/2017 | Song | G06F 1/3206 |
| 2020/0026338 A1* | 1/2020 | Maddukuri | G06F 1/28 |

(Continued)

OTHER PUBLICATIONS

Mukherjee, et al., "Distribution of Available Power to Devices in a Group," U.S. Appl. No. 17/644,020, filed Dec. 13, 2021.

(Continued)

*Primary Examiner* — Mohammed H Rehman
(74) *Attorney, Agent, or Firm* — Amin, Turocy & Watson, LLP

(57) ABSTRACT

Technology described herein relates to dynamic adjustment of power capping for one or more servers of a subset of servers. A method can comprise generating, by a system operatively coupled to a processor, for a first server subset of a server system, weighted average values comprising a first weighted average value of current workload priority at the first server subset, a second weighted average value of current performance efficiency of the first server subset, and a third weighted average value of predicted future power usage for the first server subset, ranking, by the system, the first server subset as compared to a second server subset of the server system that does not overlap servers with the first server subset, wherein the ranking is based on at least one of the weighted average values, and applying, by the system, a power cap to the first server subset based on the ranking.

20 Claims, 10 Drawing Sheets

(56) References Cited

U.S. PATENT DOCUMENTS

| | | | |
|---|---|---|---|
| 2020/0394081 A1* | 12/2020 | Manousakis | G06F 9/45558 |
| 2021/0089015 A1* | 3/2021 | Law | G05B 19/048 |
| 2021/0222904 A1* | 7/2021 | Kim | H04L 67/125 |
| 2021/0397239 A1* | 12/2021 | Sethi | G06F 1/3206 |
| 2022/0309438 A1* | 9/2022 | Basuri | G06Q 50/01 |

OTHER PUBLICATIONS

Mukherjee, et al., "Reallocation of Available Power Among Devices in a Group," U.S. Appl. No. 17/581,388, filed Jan. 21, 2021.

* cited by examiner

700

```
┌─────────────────────────────────────────────────────────────────────┐
│ GROUPING SERVERS OF A SERVER SYSTEM INTO A SUBSET OF SERVERS OF THE │
│ SERVER SYSTEM, BASED ON AT LEAST ONE OF IMPACT DATA REPRESENTATIVE  │
│ OF A BUSINESS IMPACT OR TIME DATA REPRESENTATIVE OF A PREDICTED     │
│ TURN-AROUND TIME OF AT LEAST ONE WORKLOAD BEING EXECUTED AT THE     │
│ SERVER SYSTEM. 702                                                  │
└─────────────────────────────────────────────────────────────────────┘
                                  │
                                  ▼
┌─────────────────────────────────────────────────────────────────────┐
│ OBTAINING PARAMETER DATA, TELEMETRY DATA, AND OPERATION DATA FOR A  │
│       SUBSET OF SERVERS OF A SERVER SYSTEM. 704                     │
└─────────────────────────────────────────────────────────────────────┘
                                  │
                                  ▼
┌─────────────────────────────────────────────────────────────────────┐
│ DERIVING A WEIGHTED PRIORITY FOR A SERVER OF THE SUBSET OF SERVERS  │
│              OF THE SERVER SYSTEM. 706                              │
└─────────────────────────────────────────────────────────────────────┘
                                  │
                                  ▼
┌─────────────────────────────────────────────────────────────────────┐
│ DERIVING THE WEIGHTED PRIORITY BASED ON A DETERMINATION OF WORKLOAD │
│ PRIORITY AT THE SUBSET OF SERVERS, THE WORKLOAD PRIORITY BEING      │
│ DETERMINED BASED ON TELEMETRY DATA FOR THE SUBSET OF SERVERS THAT IS│
│ COLLECTED DURING EXECUTION OF AT LEAST ONE WORKLOAD AT THE SUBSET OF│
│                    SERVERS.  708                                    │
└─────────────────────────────────────────────────────────────────────┘
                                  │
                                  ▼
┌─────────────────────────────────────────────────────────────────────┐
│ DERIVING THE WEIGHTED PRIORITY BASED ON A DETERMINATION OF AN       │
│ EFFICIENCY VALUE REPRESENTATIVE OF AN EFFICIENCY OF THE SUBSET OF   │
│ SERVERS, WHEREIN THE EFFICIENCY DATA IS DETERMINED BASED ON CURRENT │
│ CONDITION DATA REPRESENTATIVE OF CURRENT OPERATION CONDITIONS FOR   │
│ THE SUBSET OF SERVERS AS COMPARED TO HISTORICAL CONDITION DATA      │
│ REPRESENTATIVE OF HISTORICAL OPERATION CONDITIONS FOR THE SUBSET OF │
│                    SERVERS.  710                                    │
└─────────────────────────────────────────────────────────────────────┘
                                  │
                                  ▼
┌─────────────────────────────────────────────────────────────────────┐
│ DERIVING THE WEIGHTED PRIORITY BASED ON A PREDICTED POWER           │
│ CONSUMPTION DATA REPRESENTATIVE OF A PREDICTION OF FUTURE POWER     │
│ CONSUMPTION FOR THE SUBSET OF SERVERS, WHEREIN THE PREDICTED POWER  │
│ CONSUMPTION DATA IS DETERMINED USING A TIME-SERIES REGRESSION-BASED │
│              MACHINE LEARNING MODEL.  712                           │
└─────────────────────────────────────────────────────────────────────┘
                                  │
                                  ▼
                                 714
```

FIG. 7

KINETIC POWER CAPPING USING FUZZY LOGIC-BASED DYNAMIC SYSTEM PRIORITIZATION

BACKGROUND

Power capping is a process of setting a power constraint for a computer system or portion of computer system, such as a server system. Due to changes in workload(s), the power demand of a unit of a computer system, such as a unit of a server system, can vary. Based on varying power demands, allocation of power based on power capping can allow for fulfilling of the power demand.

SUMMARY

The following presents a simplified summary of the disclosed subject matter to provide a basic understanding of one or more of the various embodiments described herein. This summary is not an extensive overview of the various embodiments. It is intended neither to identify key or critical elements of the various embodiments nor to delineate the scope of the various embodiments. Its sole purpose is to present one or more concepts of the disclosure in a streamlined form as a prelude to the more detailed description that is presented later.

An example method can comprise generating, by a system operatively coupled to a processor, for a first server subset of a server system, weighted average values comprising a first weighted average value of current workload priority at the first server subset, a second weighted average value of current performance efficiency of the first server subset, and a third weighted average value of predicted future power usage for the first server subset. The method can further comprise ranking, by the system, the first server subset as compared to a second server subset of the server system that does not overlap servers with the first server subset, wherein the ranking is based on at least one of the weighted average values. The method can further comprise applying, by the system, a power cap to the first server subset based on the ranking.

An example system can comprise a processor, and a memory that stores executable instructions that, when executed by the processor, facilitate performance of operations. The operations can comprise deriving a weighted priority for a server of a subset of servers of a server system, based on the weighted priority, determining a power cap for the subset of servers of the server system, wherein the power cap comprises a quantity of power less than or equal to a total available power for the server system, and employing the power cap to power the subset of servers of the server system.

An example non-transitory computer-readable medium can comprise executable instructions that, when executed by a processor, can facilitate performance of operations. The operations can comprise determining a workload priority for a subset of servers of a server system, based on telemetry data for the subset of servers that is collected during execution of one or more workloads at the subset of servers, determining an efficiency of the subset of servers, wherein the efficiency is based on current operating conditions for the subset of servers as compared to historical operating conditions for the subset of servers, and applying a power cap to the subset of servers based on at least one of the workload priority or the efficiency.

An advantage of one or more of the above-indicated method, system and/or non-transitory computer-readable medium can be dynamically adjustable power capping based on changes in workload characterization at one or more servers of the subset of servers. This can be accomplished on a per-server basis, such as with or without adjusting overall subset power capacity, as compared to a total available power capacity for the full server system. Indeed, non-equal distribution of power to servers, such as servers having one or more same priorities, can be accomplished, such as based on the current workload characterization. That is, power allocation is not limited to a preset minimum of settings, such as high, medium, and low power capacities.

Another advantage of one or more of the above-indicated method, system and/or non-transitory computer-readable medium can be setting of dynamically adjustable priorities upon which the power capping can be based. That is, as opposed to defined static priorities (e.g., high, medium, and low), full variation of priority ranking, such as any number between a range of 0 to 10 for example, can be employed to fully, dynamically vary the priorities, and thus achieve greater correspondence with a dynamic power cap employed based, such as based on current workload characterization.

Yet another advantage of one or more of the above-indicated method, system and/or non-transitory computer-readable medium can be lack of reliance on human intervention for the dynamically adjustable power capping, and thus prevention of human error. Likewise, another advantage can be lack of use of a predictive access limitation method that can undesirably provide both false negative non-limitations and false positive limitations.

BRIEF DESCRIPTION OF THE DRAWINGS

The technology described herein is illustrated by way of example and not limited in the accompanying figures in which like reference numerals indicate similar elements.

FIG. 7 illustrates a process flow diagram of a method of dynamic power capping at a server system, in accordance with one or more embodiments and/or implementations described herein.

DETAILED DESCRIPTION

Overview

Figure 1:
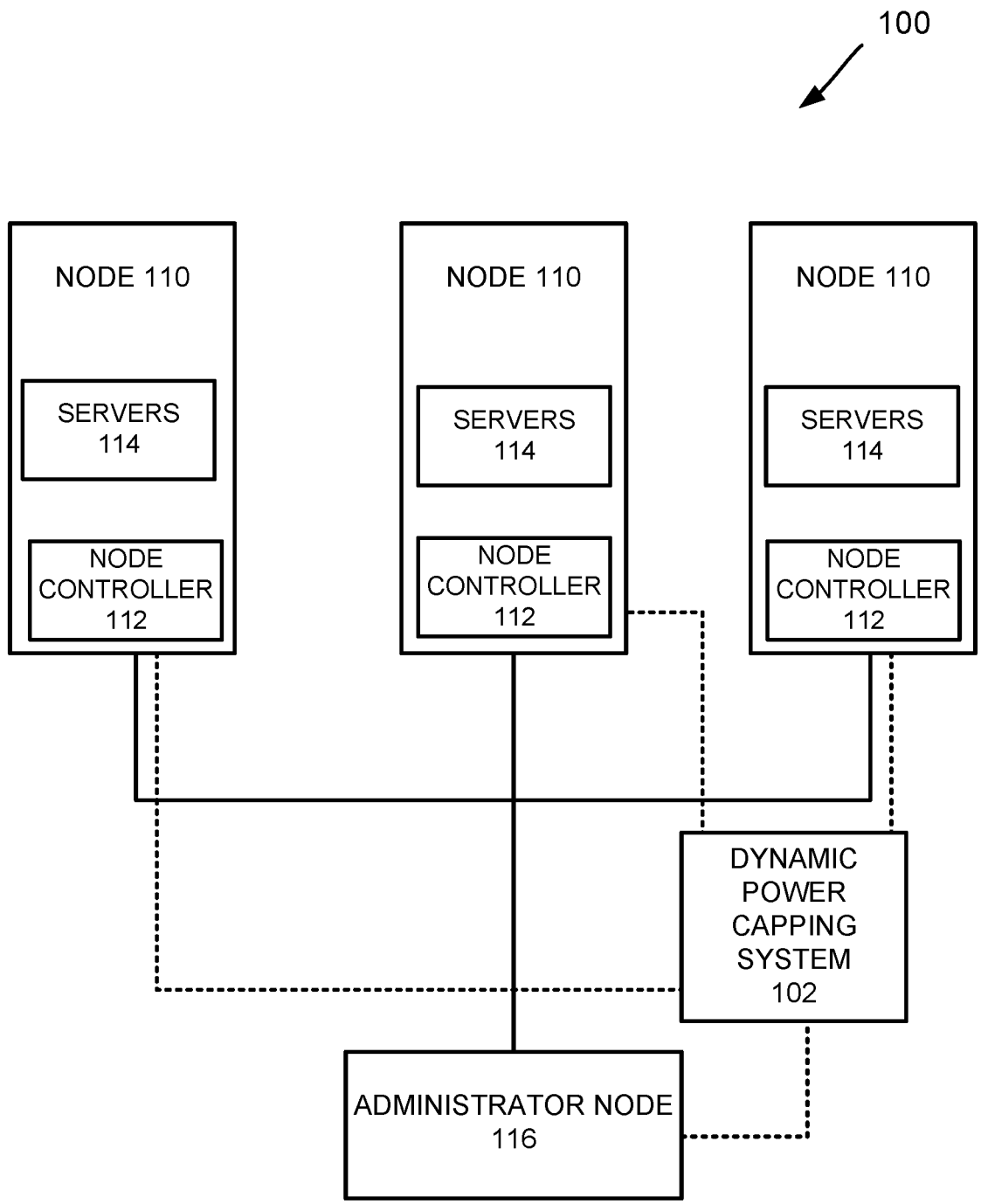
FIG. 1 illustrates a block diagram of a server system, in accordance with one or more embodiments and/or implementations described herein.

The technology described herein is generally directed towards determining allocation of power at a plurality of servers of a server system, such as determining allocation of power within a subset of servers of the server system.

In one or more existing frameworks, due to changes in workload(s) at individual servers, a subset of servers and/or the server system generally, a power demand of one or more individual servers can vary. This variance can occur over time, such as measured in any whole or fraction of minutes, hours, days, and/or the like.

"Static capping" on an individual server basis can be employed in existing frameworks, however this type of capping is based on predefined capping values for power for individual servers, subsets of servers, and/or the like. That is, these predefined values are not dynamic and do not allow a server's power allocation to vary (e.g., adapt, change, increase, decrease) where power is available, resulting in artificial restriction of the respective server system's performance.

In alternative existing frameworks, "semi-dynamic power capping" can be employed based on pre-defined static priorities of a subset of servers (e.g., a group of servers of the server system). That is, adjustment can be made only with consideration to total power allocated to the group versus total power available to the server system. Indeed, use of static priorities (high, medium, low) does not account for the variance in workloads of servers of a server system. Further, workload characterization is not considered, and instead, equal distribution of power to servers belonging to same priorities irrespective of workloads supported is employed.

To account for one or more of the aforementioned deficiencies with existing power allocation frameworks for server system, one or more embodiments herein can provide a framework for dynamically varying power allocation to individual servers, and not just to subsets of servers of a server system. This dynamically varied power allocation can be fully adjustable, rather than just limited to any particular predefined and/or static cap level, and thus adjustability of a cap for an individual server, for an individual server of a subset and/or for a subset of servers can be limited only by total power allocation available to the server system in whole. Likewise, the dynamically varied power allocation can be fully adjustable relative to and/or based on priorities of individual servers, individual servers of a subset, and/or a subset of servers, which priorities can be varied and fully adjustable, such as between a range of 0 and 10. Thus, the priorities can be any relative amount, apart from any static and/or pre-defined values, such as only high, medium and low priorities.

The priorities can be weighted priorities for individual servers, such as for each individual server of a subset of servers, and thus can allow for non-equal distribution of power (e.g., different individual allocation of power) for two or more, or even all, individual servers of a subset of servers. Likewise, this weighting can be applied relative to servers of plural subsets of a server system.

Briefly, the one or more frameworks described herein can employ a fuzzy-based dynamic power capping policy that can intelligently adjust power allocation of individual servers of a server system and/or of a subset of servers of a server system. This allocation can be made without any need for user/administrator entity intervention. This allocation can be re-generated and re-employed at any suitable frequency, and/or on-demand, upon request, and/or upon determined change in workload characterization for at least one server.

The aforementioned weighted priorities can allow for dynamic ranking of servers to be based on any one or more of a plurality of aspects, such as system and/or subset efficiency, priority of workloads and/or predictive power consumption. That is, these aspects can be considered individually and/or in any combination (e.g., in aggregate). Each of these aspects can have unique inputs, such as vendor parameters, workload parameters, telemetry data, performance parameters and/or the like that can be obtained and considered based on current data and/or historical data relative to the aspect. In one or more embodiments, an analytical model, such as employing artificial intelligence, can be employed to derive one or more weighted sub-priorities based the aforementioned aspects, and/or to derive an aggregated weighted priority based two or more of the aforementioned aspects.

Furthermore, the dynamically determined allocation itself can be automatically employed (e.g., used, applied and/or the like) by a respective server system, such as by an administrator node of the server system in combination with one or more instructions to individual node controllers, such as where each node of a server system comprises plural servers, and which nodes are globally controlled by the administrator node.

Reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

As used herein, with respect to any aforementioned and below mentioned uses, the term "in response to" can refer to any one or more states including, but not limited to: at the same time as, at least partially in parallel with, at least partially subsequent to and/or fully subsequent to, where suitable.

As used herein, the term "entity" can refer to a machine, device, smart device, component, hardware, software and/or human.

As used herein, the term "cost" can refer to power, money, memory, processing power and/or the like.

As used herein, the term "power" can refer to electrical and/or other source of power available to the server system.

As used herein, the term "resource" can refer to power, money, memory, processing power and/or the like.

As used herein, the term "data" can comprise "metadata."

Example Architectures

One or more embodiments are now described with reference to the drawings, where like referenced numerals are used to refer to like elements throughout. In the following description, for purposes of explanation, numerous specific details are set forth to provide a more thorough understanding of the one or more embodiments. It is evident, however, in various cases, that the one or more embodiments can be practiced without these specific details.

Further, the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting system architectures described, and/or systems thereof, can further comprise one or more computer and/or computing-based elements described herein with reference to an operating environment, such as the operating environment 900 illustrated at FIG. 9. In one or more described embodiments, computer and/or computing-based elements can be used in connection with implementing one or more of the systems, devices, components and/or computer-implemented operations shown and/or described in connection with FIGS. 1-6 and/or with other figures described herein.

Turning first to FIG. 1, a server system architecture 100 is illustrated comprising a plurality of servers 114 distributed throughout a plurality of nodes 110. Each node 110 can be controlled by a node controller 112, which can globally be controlled by an administrator node 116. That is, the nodes 110 and the administrator node 116 can be operably coupled to one another in any suitable manner.

A dynamic power capping system 102 according to one or more embodiments described herein above and below can communicate with the server system to dynamically adjust power capping at one or more servers 114. The dynamic power capping system 102 can be disposed at the server system 100, as illustrated, and/or can be disposed external to the server system 100, where communication with the server system can be provided over a cloud and/or over a network.

The server system 100 itself can be accessed over a cloud and/or over a network.

Figure 2:
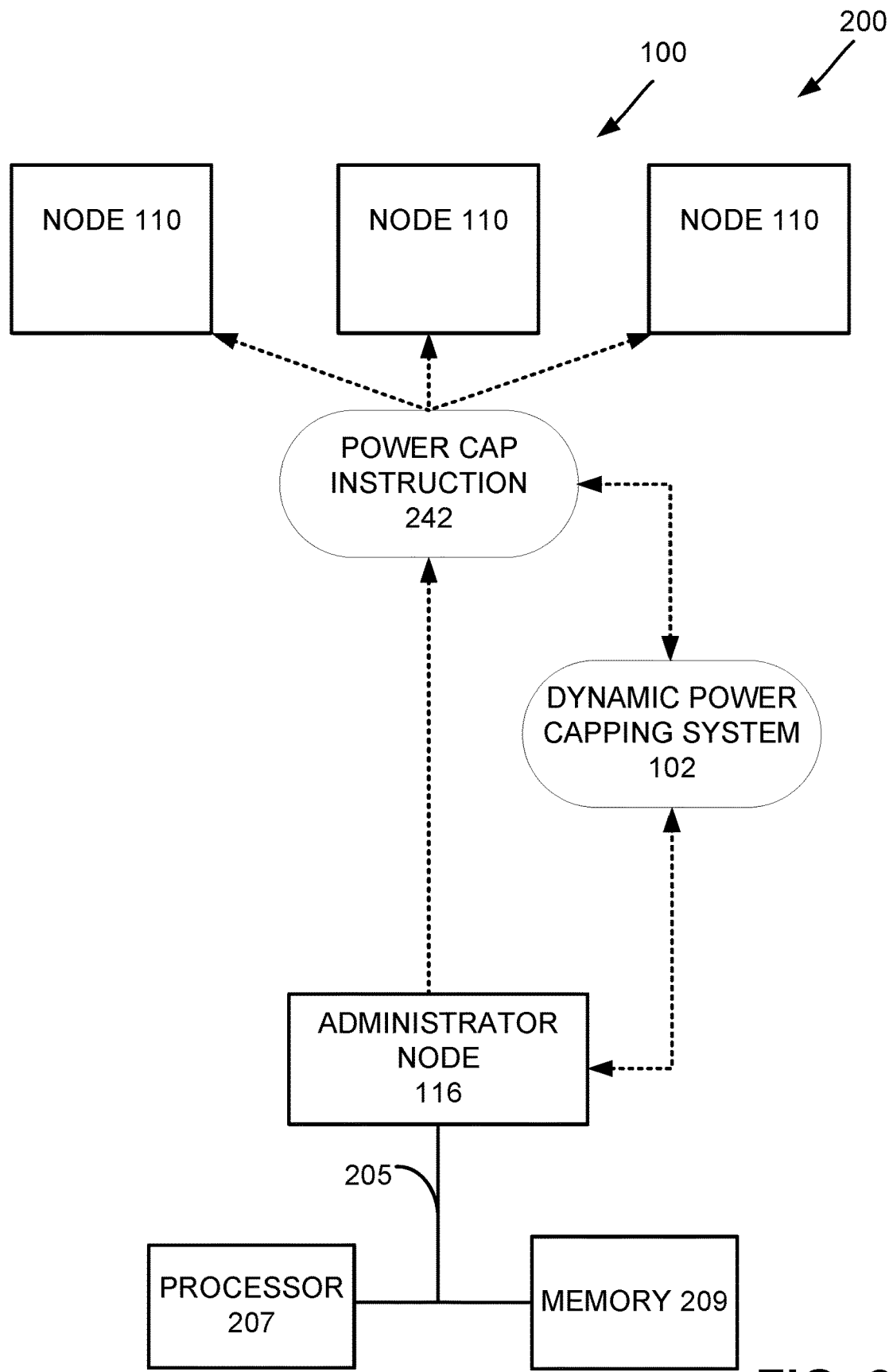
FIG. 2 illustrates a block diagram of a part of a server system, in accordance with one or more embodiments and/or implementations described herein.

Turning next to FIG. 2, a partial schematic 200 of the server system architecture 100 of FIG. 1 is depicted, illustrating additional aspects/elements of the architecture 100. While referring here to one or more processes, operations, facilitations and/or uses of the non-limiting system 200, description provided herein, above and/or below also can be relevant to one or more other non-limiting system architectures described herein (e.g., 100, 300 and/or 400). Repetitive description of like elements and/or processes employed in respective embodiments is omitted for sake of brevity.

Generally, the server system architecture 100 can comprise any suitable computing devices, hardware, software, operating systems, drivers, network interfaces and/or so forth. For example, the administrator node 116 can be operably coupled to a suitable processor 207 and memory 209 by a bus 205. In one or more embodiments, the administrator node 116 can comprise the processor 207 and/or memory 209.

Communication among between the illustrated nodes 110 the administrator node 116, and/or the dynamic power capping system 102 can be by any suitable method. Communication can be facilitated by wired and/or wireless methods including, but not limited to, employing a cellular network, a wide area network (WAN) (e.g., the Internet), and/or a local area network (LAN). Suitable wired or wireless technologies for facilitating the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an ANT, an ultra-wideband (UWB) standard protocol and/or other proprietary and/or non-proprietary communication protocols.

Discussion first turns to the processor 207, memory 209 and bus 205 of the multi-node system 100.

In one or more embodiments, the server system architecture 100 can comprise a processor 207 (e.g., computer processing unit, microprocessor, classical processor and/or like processor). In one or more embodiments, a component associated with server system architecture 100, as described herein with or without reference to the one or more figures of the one or more embodiments, can comprise one or more computer and/or machine readable, writable and/or executable components and/or instructions that can be executed by processor 207 to facilitate performance of one or more processes defined by such component(s) and/or instruction(s).

In one or more embodiments, the server system architecture 100 can comprise a machine-readable memory 209 that can be operably connected to the processor 207. The memory 209 can store computer-executable instructions that, upon execution by the processor 207, can cause the processor 207 and/or one or more other components of the server system architecture 100 to perform one or more actions. In one or more embodiments, the memory 209 can store computer-executable components.

The server system architecture 100 and/or a component thereof as described herein, can be communicatively, electrically, operably, optically and/or otherwise coupled to one another via a bus 205 to perform functions of non-limiting system architecture 200, server system architecture 100 and/or one or more components thereof and/or coupled therewith. Bus 205 can comprise one or more of a memory bus, memory controller, peripheral bus, external bus, local bus and/or another type of bus that can employ one or more bus architectures. One or more of these examples of bus 205 can be employed to implement one or more embodiments described herein.

In one or more embodiments, server system architecture 100 can be coupled (e.g., communicatively, electrically, operatively, optically and/or like function) to one or more external systems (e.g., a system management application), sources and/or devices (e.g., classical communication devices and/or like devices), such as via a network. In one or more embodiments, one or more of the components of the server system architecture 100 can reside in the cloud, and/or can reside locally in a local computing environment (e.g., at a specified location(s)).

In addition to the processor 207 and/or memory 209 described above, server system architecture 100 can comprise one or more computer and/or machine readable, writable and/or executable components and/or instructions that, when executed by processor 207, can facilitate performance of one or more operations defined by such component(s) and/or instruction(s).

As additionally show at FIG. 2, the dynamic power capping system 202 and/or the administrator node 116 (e.g., by way of communication/direction from the dynamic power capping system 102) can communicate a power cap instruction 242 to one or more of the nodes 110 to adjust a power allocation of one or more servers 114 of the server system architecture 100.

Figure 3:
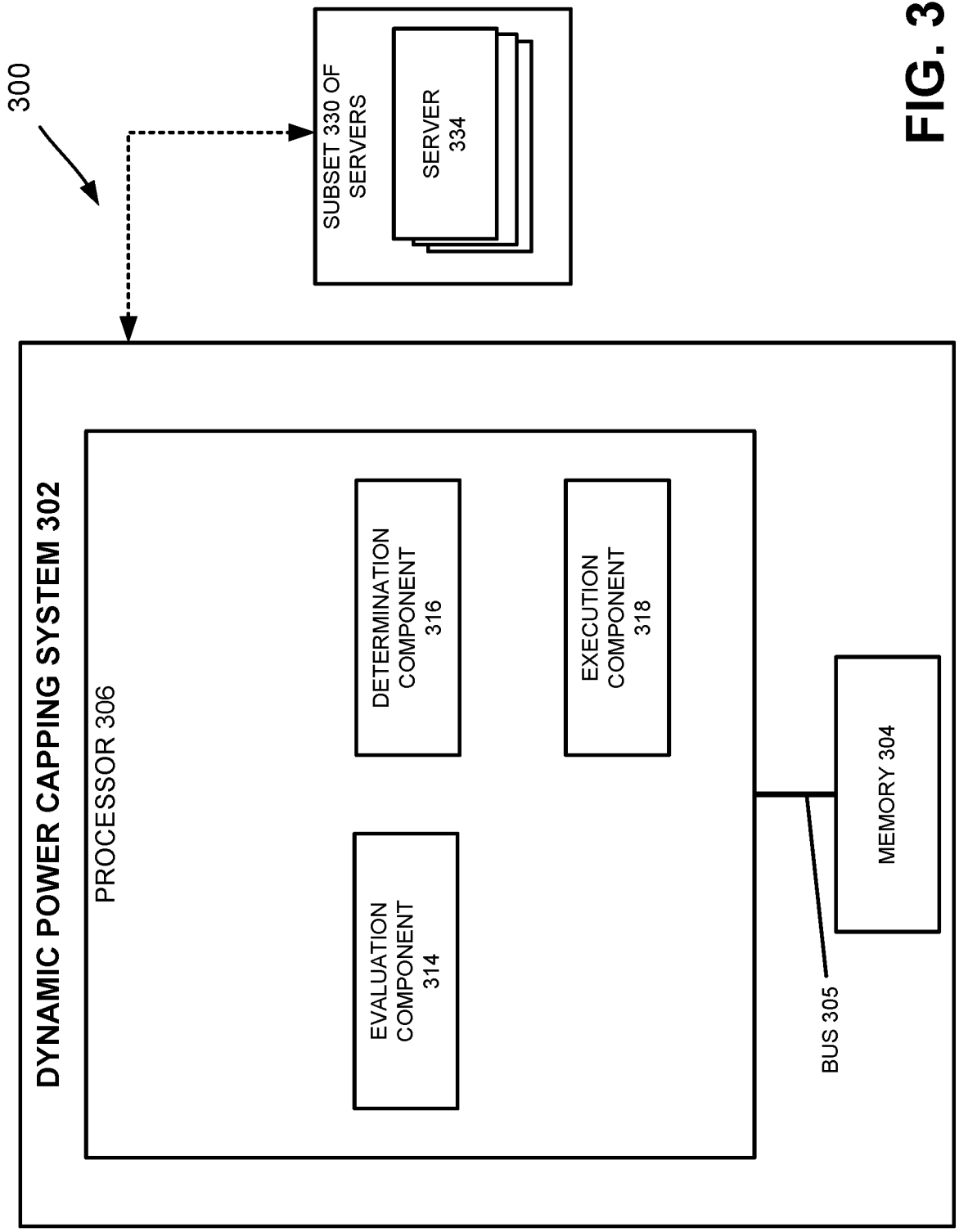
FIG. 3 illustrates a block diagram of a dynamic power capping system, in accordance with one or more embodiments and/or implementations described herein.

Turning next to FIG. 3, an architecture 300 is illustrated comprising a dynamic power capping system 302 that can function to aid a server system, such as a subset 330 of servers 334 by determining and applying varied allocation of power to different individual ones of the servers 334. The dynamic power capping system 302 can be operably coupled to the subset 330 of servers by a network, cloud and/or any other suitable manner. Additional description of a server system comprising the subset 330 is not again provided for sake of brevity. Description provided above relative to the server system architecture 100 and/or system 200 can be applicable to a server system comprising the subset 330.

Generally, the dynamic power capping system 302 can comprise any suitable computing devices, hardware, software, operating systems, drivers, network interfaces and/or so forth. As illustrated, the dynamic power capping system 302 comprises an evaluation component 314, determination component 316 and execution component 318. These components are comprised by a processor 306. Although, in one or more other embodiments, any one or more of these components can be external to the processor 306. A bus 305 operatively couples the processor 306 and a memory 304.

Referring briefly to the aforementioned components, the evaluation component 314 can generally derive a weighted priority for a server 334 of a subset (e.g., subset 330) of a server system. The determination component 316 can generally, based on the derived weighted priority, can determine a power cap for the subset 330, wherein the power cap can comprise a quantity of power less than or equal to a total available power for the server system. The execution component 318 can employ (e.g., apply, send an instruction relative to, use, implement and/or the like) that power cap to power the subset 330.

Figure 4:
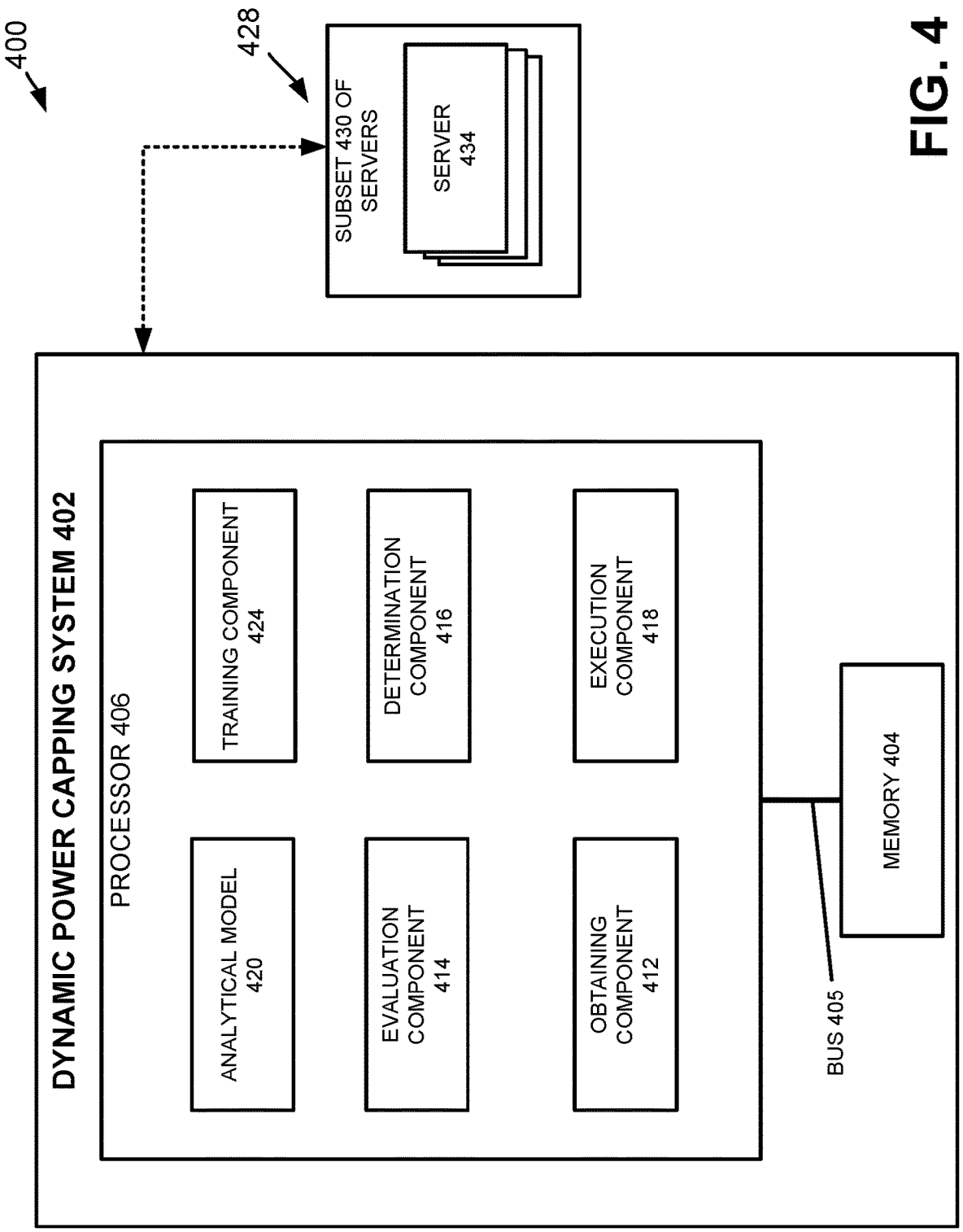
FIG. 4 illustrates a block diagram of another dynamic power capping system, in accordance with one or more embodiments and/or implementations described herein.

Turning next to FIG. 4, an architecture 400 is illustrated comprising a dynamic power capping system 402 that can function to aid a server system, such as a subset 430 of servers 434 by determining and applying varied allocation of power to different individual ones of the servers 434. The dynamic power capping system 402 can be operably coupled to the subset 430 of servers by a network, cloud and/or any other suitable manner. Additional description of a server system 428 comprising the subset 430 is not again provided for sake of brevity. Description provided above relative to the server system architecture 100, 200 and/or system 300 can be applicable to the server system 428 comprising the subset 430.

Generally, the dynamic power capping system 402 can comprise any suitable computing devices, hardware, software, operating systems, drivers, network interfaces and/or so forth. As illustrated, the dynamic power capping system 402 comprises an obtaining component 412, evaluation component 414, determination component 416, execution component 418, analytical model 420 and/or training component 424. These components can be comprised by a processor 406. Although, in one or more other embodiments, any one or more of these components can be external to the processor 406. A bus 405 operatively couples the processor 406 and a memory 404.

Communication among the components of the dynamic power capping system 402 can be by any suitable method. Communication can be facilitated by wired and/or wireless methods including, but not limited to, employing a cellular network, a wide area network (WAN) (e.g., the Internet), and/or a local area network (LAN). Suitable wired or wireless technologies for facilitating the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an ANT, an ultra-wideband (UWB) standard protocol and/or other proprietary and/or non-proprietary communication protocols.

Discussion first turns to the processor 406, memory 406 and bus 405 of the dynamic power capping system 402.

In one or more embodiments, the dynamic power capping system 402 can comprise a processor 406 (e.g., computer processing unit, microprocessor, classical processor and/or like processor). In one or more embodiments, a component associated with dynamic power capping system 402, as described herein with or without reference to the one or more figures of the one or more embodiments, can comprise one or more computer and/or machine readable, writable and/or executable components and/or instructions that can be executed by processor 406 to facilitate performance of one or more processes defined by such component(s) and/or instruction(s).

In one or more embodiments, the dynamic power capping system 402 can comprise a machine-readable memory 404 that can be operably connected to the processor 406. The memory 404 can store computer-executable instructions that, upon execution by the processor 406, can cause the processor 406 and/or one or more other components of the dynamic power capping system 402 to perform one or more actions. In one or more embodiments, the memory 404 can store computer-executable components.

The dynamic power capping system 402 and/or a component thereof as described herein, can be communicatively, electrically, operatively, optically and/or otherwise coupled to one another via a bus 405 to perform functions of non-limiting system architecture 400, dynamic power capping system 402 and/or one or more components thereof and/or coupled therewith. Bus 405 can comprise one or more of a memory bus, memory controller, peripheral bus, external bus, local bus and/or another type of bus that can employ one or more bus architectures. One or more of these examples of bus 405 can be employed to implement one or more embodiments described herein.

In one or more embodiments, dynamic power capping system 402 can be coupled (e.g., communicatively, electrically, operatively, optically and/or like function) to one or more external systems (e.g., a system management application), sources and/or devices (e.g., classical communication devices and/or like devices), such as via a network. In one or more embodiments, one or more of the components of the dynamic power capping system 402 can reside in the cloud, and/or can reside locally in a local computing environment (e.g., at a specified location(s)).

In addition to the processor 406 and/or memory 404 described above, the dynamic power capping system 402 can comprise one or more computer and/or machine readable, writable and/or executable components and/or instructions that, when executed by processor 406, can facilitate performance of one or more operations defined by such component(s) and/or instruction(s).

Direction next turns first to the obtaining component 412. The obtaining component 412 can receive, transmit, locate, identify and/or otherwise obtain various data (e.g., including metadata) that can be employed by the evaluation component 414 to derive one or more weighted priorities (whether individual and/or aggregated priorities). As will be further described below, this data can comprise vendor benchmark data, component classification data, telemetry data, pre-defined static workload rankings, timescale based ranking data, power use data, performance data, key performance indicator (KPI) data, operation data and/or the like. Any of these aspects of data can be obtained in a current (e.g., real-time) form and/or as historical (e.g., past) data. Referring to the historical data, such data can be stored at any suitable location, such as the memory 404 and/or another storage database internal to or external to the dynamic power capping system 402. The various data mentioned above are not meant to be limiting and can be in any suitable format (e.g., logs, lists, matrices, code and/or the like).

The obtaining component 412 can obtain such data at any suitable frequency (e.g., repeated obtaining), on-demand, upon request and/or the like. An administrator entity, user entity and/or default setting can determine the specified frequency of time.

In one or more embodiments, the obtaining component 412 can obtain a request for a power re-allocation, such as from a user entity, administrator node, administrator entity and/or the like.

In one or more embodiments, the obtaining component 412 can obtain feedback for implementing an altered derivation of a weighted priority (e.g., by the evaluation component 414). The feedback can be provided by any of a user entity, administrator node, administrator entity, device associated with such entities and/or the like.

Turning next to the evaluation component 414, this component generally can derive a weighted priority for at least one server 434 of a subset (e.g., the subset 430) of servers. It is noted that the processes described herein can be scalable. Thus, the evaluation component 414 can derive one or more weighted priorities for one or more servers 434 of one or more subsets 430 of a server system 428, at least partially at the same time as one another.

As indicated above, the weighted priorities can be individual weighted priorities that are based on a single aspect or category and/or can be an aggregated weighted priority that is based on plural aspects or categories. For example, individual weighted priorities (again, "individual" with respect to a single aspect or category) can be derived based on any aspects such as, but not limited to, system and/or subset efficiency, priority of workloads and/or predictive power consumption. In this way, the use of the weighted priorities can be "fuzzy-based," such as where some of the data can be tabulated and/or ranked to allow for quantification of non-numeric (e.g., fuzzy) data.

Before turning to particular description of aspects by which a weighted priority can be derived by the evaluation component 414, it is noted that in one or more embodiments, the evaluation component 414 can group one or more servers 434 into the subsets 434. This initial grouping can be performed based on quantified business impacts, turn-around time for workloads and/or the like, which can be quantified on a suitable time scale. It is noted that such grouping can be performed in conjunction with and/or separately from scheduling of workloads by the respective server system 428. For example, where the administrator node, for example, can schedule such workloads, and wherein based on the data resulting from the administrator node (e.g., obtained by the obtaining component 412), the evaluation component 414 can group servers 434 for purposes of power allocation (e.g., which can be different than grouping for performance of workloads).

Additionally, in one or more embodiments, a grouping/re-grouping of at least one server 434 of a subset 430 of servers can be grouped/re-grouped, such as based on one or more of the weighted priorities, for the derivation details are provided below. That is, in addition to deriving the one or more individual weighted priorities, the evaluation component 414 can also remove and/or add one or more servers 434 from the subset 430 for which a power allocation is ultimately being determined by the combined processes of the evaluation component 414 and determination component 416.

Description now turns to such various aspects by which a weighted priority can be derived. Initial description is first provided, with mathematical and formulaic description applicable to each of the different various aspects following the initial description.

Turning now a first aspect by which a weighted priority can be derived, in one or more embodiments, the evaluation component 414 can derive an individual weighted priority based on a determination of workload priority at the subset of servers, the workload priority being determined based on telemetry data for the subset of servers that is collected during execution of at least one workload at the subset of servers.

Figure 5:
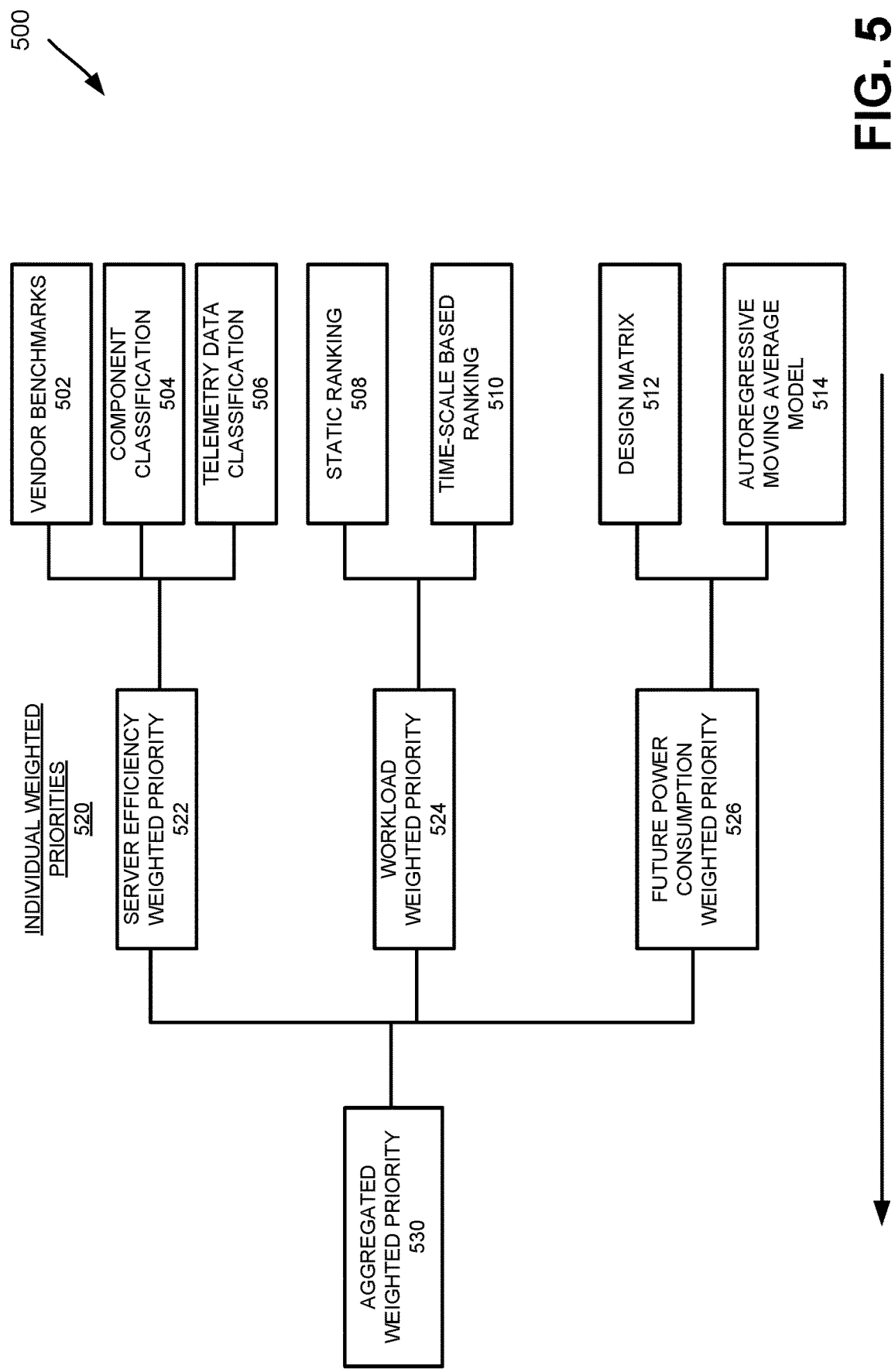
FIG. 5 illustrates a process flow diagram of one or more inputs and/or outputs of the dynamic power capping system of FIG. 4, in accordance with one or more embodiments and/or implementations described herein.

For example, turning to FIG. 5, in addition to FIG. 4, a server efficiency weighted priority 522 can be based on data defining vendor benchmarks 502, component classification 504 and/or telemetry data classification 506, without being limited thereto. An efficiency can be defined as actual use of power as compared to power allocated to a server and/or component of a server. Another efficiency can be defined as actual throughput, bandwidth and/or the like as compared to allowable throughput and/or bandwidth (e.g., based on a default setting and/or threshold). A vendor specific benchmark 502 can be a default and/or updated benchmark provided by the vendor, which can be quantified by the evaluation component 414. A component classification 504 can be based on an efficiency per component that is determined by the server system, such as based on performance, telemetry and/or KPI data collected over time. Telemetry data classification can be defined as classifying resource utilization by a server and/or operating conditions. This can comprise, but is not limited to data relative to power, memory, bandwidth, latency, operations performed, errors issued and/or the like. As a summary, with reference to time-series historical utilization datasets and a static efficiency ranking (e.g., per component and/or provided by a vendor), using weighted-average methodology, a correspondence can be established to determine the server efficiency weighted priority (SEW) 522.

Any one or more of these data can be employed by the evaluation component (e.g., individually and/or in aggregate) to determine a weighted priority, such as between 0 and 10, although any other suitable ranking system can be employed. Particularly, as defined above, any number, whole number and/or fraction thereof, within a ranking range can be employed for any one or more individual servers 434. That is, the evaluation component 414 is not limited to pre-defined and/or static priorities (e.g., 1, 5 and 9 and/or low, medium and/or high).

Turning to another aspect by which a weighted priority can be derived, in one or more embodiments, the evaluation component 414 can derive an individual weighted priority based on a determination of an efficiency value representative of an efficiency of the subset of servers, wherein the efficiency data is determined based on current condition data representative of current operating conditions for the subset of servers as compared to historical condition data representative of historical operating conditions for the subset of servers.

For example, turning to FIG. 5, in addition to FIG. 4, a workload weighted priority 524 can be based on data comprising a static workload ranking 508 and/or a timescale-based ranking 510. The static workload ranking 508 can be used as an initial ranking which can be modified based on a timescale-based ranking, such as employing current workload characterization data. This can comprise, but is not limited to number of operations performed in parallel, number of operations performed in total, types of operations, resources employed by the operations, resources requested, sequence of operations, repeated operations and/or the like. In one or more embodiments, the workload weighted priority 524 can be derived based on one or more current workloads (e.g., on the workload characterization data defining such one or more current workloads) being executed by the servers for which the workload weighted priority 524 is being derived. In summary, with reference to time-series workload characterization, using weighted-average methodology, a correspondence can be established to determine the workload weighted priority (WW) 524.

Any one or more of these data can be employed by the evaluation component (e.g., individually and/or in aggregate) to determine a weighted priority, such as between 0 and 10, although any other suitable ranking system can be employed. Particularly, as defined above, any number, whole number and/or fraction thereof, within a ranking range can be employed for any one or more individual servers 434. That is, the evaluation component 414 is not limited to pre-defined and/or static priorities (e.g., 1, 5 and 9 and/or low, medium and/or high).

Turning to still another aspect by which a weighted priority can be derived, in one or more embodiments, the evaluation component 414 can derive an individual weighted priority based on predicted power consumption data representative of a prediction of future power consumption for the subset of servers, wherein the predicted power consumption data is determined using a time-series regression-based machine learning model.

For example, turning to FIG. 5, in addition to FIG. 4, a future power consumption weighted priority 526 can be based on historical telemetry data for one or more servers 434 of the subset 430. Use of this historical telemetry data can result in generation of a design matrix 512, which can be employed by an autoregressive moving average (ARMA) model employed by the evaluation component 414.

With reference to determining the future power consumption weighted priority 526, the evaluation component 414 can comprise and/or employ a power consumption software module. The power consumption software module can predict power consumption for a server based on telemetry-based historical datasets. The power consumption software can predict peak and average power, as well as temporal variation in power, based on time-series regression models, such as employing machine learning (ML) techniques (e.g., employing the analytical model 420).

First a derivation of time-series based design matrix ($X_t$) (also referred to as a feature or regressor power matrix) can be generated. This design matrix can comprise current and past observations of minimum, maximum and average system (e.g., server, subset, system) power consumption ordered by time (t), based on the collected telemetry-based historical datasets. Using the design matrix, an autoregressive moving average (ARMA) method model can evaluate the design matrix to predict the power consumption for a server. The ARMA method model, in one or more embodiments, can employ power as a univariate time-series attribute, such as without influence of seasonal characteristics, such as power outages, whether intentional and/or unintentional. The ARMA method model can combine both autoregression (AR) and moving average (MA) models.

Any one or more of the regression models, AR models, MA models, and/or ARMA method model can be comprised by and/or employed by the evaluation component 414 and/or analytical model 420.

In summary, with reference to time-series historical power consumption datasets and predictive power consumption values, using weighted-average methodology, a correspondence can be established to determine the future power consumption weighted priority (FPCW) 526.

Any one or more of these data can be employed by the evaluation component (e.g., individually and/or in aggregate) to determine a weighted priority, such as between 0 and 10, although any other suitable ranking system can be employed. Particularly, as defined above, any number, whole number and/or fraction thereof, within a ranking range can be employed for any one or more individual servers 434. That is, the evaluation component 414 is not limited to pre-defined and/or static priorities (e.g., 1, 5 and 9 and/or low, medium and/or high).

For example, any one of the aforementioned individual weighted priorities 520 can be determined based on a weight sum method (WSM), which can be defined as a multi-criteria decision-making method used to evaluate several alternatives for different decision criteria. For example, Equation 1 can be employed, resulting in a $w_j$ which can later be employed by the determination component as a $W_i$ (weighted priority) alone or aggregated with one or more other $w_j$'s to output an aggregate $W_i$ for use in Equation 2 by the determination component 416.

$$\Sigma w_j\, a_{ij} \text{ for } i=1, 2, \ldots m. \quad \text{Equation 1:}$$

At Equation 1, wj denotes the relative weight of importance of the criterion Cj and aij is the performance value of alternative Ai. An alternative, as used here, can represent evaluation of a different decision criteria which can yield an optimized outcome in a multi-criteria decision making method. Each alternative can be evaluated in terms of criterion C. In other words, the WSM is a multi-criterion decision-making method in which there will be multiple alternatives and we have to determine the best alternative based on multiple criteria.

An example of the WSM application is provided below for the server efficiency weighted priority 522 (SEW), workload weighted priority 524 (WW), and future power consumption weighted priority 526 (FPCW), derived at three separate times (T1, T2 and T3) for a set of five servers (S1, S2, S3, S4 and S5) of s subset.

An example application of the WSM method for SEW, WW and FPCW, relative to the 5-server subset can employ the following steps: 1) Determine the number of servers in the subset or group—here being 5; and 2) Compute the individual weighted priorities of each server, using attributes and characterizations.

Consider, for example, Table 1: Sample Dataset, where each of SEW, WW and FPCW each are determined based on a 0-10 ranking system for each server in the 5-server subset. Note that the term "max" denotes the max ranking in any one column (SEW, WW, FPCW).

TABLE 1

Sample Dataset

| | T1 | | | T2 | | | T3 | | |
|---|---|---|---|---|---|---|---|---|---|
| | SEW | WW | FPCW | SEW | WW | FPCW | SEW | WW | FPCW |
| Weight | 0.33 | 0.33 | 0.33 | 0.33 | 0.33 | 0.33 | 0.33 | 0.33 | 0.33 |
| S1 | 4 | 4 | 3 | 3 | 4 | 5 | 4 | 4 | 4 |
| S2 | 5 | 6 | | 4 | 6 | 5 | 6 | 6 | 4 |
| S3 | 8 | 8 | 6 | 9 (max) | 8 | 9 | 9 (max) | 8 | 8 (max) |
| S4 | 8 | 9 (max) | 9 (max) | 8 | 9 (max) | 9 (max) | 9 (max) | 9 (max) | 7 |
| S5 | 9 (max) | 8 | 9 | 8 | 8 | 9 (max) | 9 (max) | 8 | 8 |

These initial rankings at Table 1 can then be normalized, as depicted at Table 2 and Table 3, illustrated below.

At Table 2, initial normalization is illustrated with each initial ranking from Table 1 being revised as a fraction of a maximum ranking of the respective column. For example, 9 is the maximum ranking at column T1:SEW, while 8 is the maximum ranking at column T3:FPCW.

TABLE 2

Normalization

| | T1 | | | T2 | | | T3 | | |
|---|---|---|---|---|---|---|---|---|---|
| | SEW | WW | FPCW | SEW | WW | FPCW | SEW | WW | FPCW |
| Weight | 0.33 | 0.33 | 0.33 | 0.33 | 0.33 | 0.33 | 0.33 | 0.33 | 0.33 |
| S1 | 4/9 | 4/9 | 3/9 | 3/9 | 4/9 | 5/9 | 4/9 | 4/9 | 4/8 |
| S2 | 5/9 | 6/9 | 5/9 | 4/9 | 6/9 | 5/9 | 6/9 | 6/9 | 4/8 |
| S3 | 8/9 | 8/9 | 6/9 | 9/9 | 8/9 | 9/9 | 9/9 | 8/9 | 8/8 |
| S4 | 8/9 | 9/9 | 9/9 | 8/9 | 9/9 | 9/9 | 9/9 | 9/9 | 7/8 |
| S5 | 9/9 | 8/9 | 9/9 | 8/9 | 8/9 | 9/9 | 9/9 | 8/9 | 8/8 |

Relative to Table 3, normalization formulae can be based on attribute values, weight and/or beneficial/non-beneficial characterization. In the present example, each of the attributes are identified as beneficial, and the weights are equally distributed amongst the attributes. In other example, one or more attributes (e.g., aspects/columns can be non-beneficial and/or non-equally distributed compared to one or more other aspects/columns).

For example, for beneficial attributes, equation $X=x/x_{max}$ can be used, where for non-beneficial attributes, equation $X=x_{min}/x$ can be used. Use of the beneficial attribute equation is provided and depicted at Table 3.

TABLE 3

Normalized Weight

| | T1 | | | T2 | | | T3 | | |
|---|---|---|---|---|---|---|---|---|---|
| | SEW | WW | FPCW | SEW | WW | FPCW | SEW | WW | FPCW |
| Weight | 0.33 | 0.33 | 0.33 | 0.33 | 0.33 | 0.33 | 0.33 | 0.33 | 0.33 |
| S1 | (4/9) * 0.33 | (4/9) * 0.33 | (3/9) * 0.33 | 3/9 * 0.33 | 4/9 * 0.33 | 5/9 * 0.33 | 4/9 * 0.33 | 4/9 * 0.33 | 4/8 * 0.33 |
| S2 | (5/9) * 0.33 | (6/9) * 0.33 | (5/9) * 0.33 | 4/9 * 0.33 | 6/9 * 0.33 | 5/9 * 0.33 | 6/9 * 0.33 | 6/9 * 0.33 | 4/8 * 0.33 |
| S3 | (8/9) * 0.33 | (8/9) * 0.33 | (6/9) * 0.33 | 9/9 * 0.33 | 8/9 * 0.33 | 9/9 * 0.33 | 9/9 * 0.33 | 8/9 * 0.33 | 8/8 * 0.33 |
| S4 | (8/9) * 0.33 | (9/9) * 0.33 | (9/9) * 0.33 | 8/9 * 0.33 | 9/9 * 0.33 | 9/9 * 0.33 | 9/9 * 0.33 | 9/9 * 0.33 | 7/8 * 0.33 |
| S5 | (9/9) * 0.33 | (8/9) * 0.33 | (9/9) * 0.33 | 8/9 * 0.33 | 8/9 * 0.33 | 9/9 * 0.33 | 9/9 * 0.33 | 8/9 * 0.33 | 8/8 * 0.33 |

Resultant normalized weighted priorities (e.g., results of the beneficial attribute equation) are illustrated at Table 4.

TABLE 4

Time-Specific Weighted Priorities (WP) of the Servers

| | T1 | | | | | T2 | | | | | T3 | | | | |
|---|---|---|---|---|---|---|---|---|---|---|---|---|---|---|---|
| Weight | SEW 0.33 | WW 0.33 | FPCW 0.33 | Score | WP | SEW 0.33 | WW 0.33 | FPCW 0.33 | Score | WP | SEW 0.33 | WW 0.33 | FPCW 0.33 | Score | WP |
| S1 | 0.1467 | 0.1467 | 0.11 | 0.4034 | 2 | 0.11 | 0.1467 | 0.1833 | 0.44 | 2 | 0.1467 | 0.1467 | 0.165 | 0.4584 | 2 |
| S2 | 0.1833 | 0.22 | 0.1833 | 0.5866 | 3 | 0.1467 | 0.22 | 0.1833 | 0.55 | 3 | 0.22 | 0.22 | 0.22 | 0.66 | 3 |
| S3 | 0.2933 | 0.2933 | 0.22 | 0.8066 | 4 | 0.33 | 0.2933 | 0.33 | 0.9533 | 5 | 0.33 | 0.2933 | 0.2933 | 0.9166 | 4 |
| S4 | 0.2933 | 0.33 | 0.33 | 0.9533 | 5 | 8.2933 | 0.33 | 0.33 | 0.9533 | 5 | 0.33 | 0.33 | 0.33 | 0.99 | 5 |
| S5 | 0.33 | 0.2933 | 0.33 | 0.9533 | 5 | 0.2933 | 0.2933 | 0.33 | 0.9166 | 4 | 0.33 | 0.2933 | 0.2933 | 0.9166 | 4 |

Based on one or more of these individual weighted priorities 512, and/or on the data underlying these individual weighted priorities 512, the determination component 416 can derive a final weighted priority, which can be an aggregated priority based on two or more of such individual weighted priorities 512 and/or on the data underlying such individual priorities 512.

It is noted that, in the example, relative to one another, the SEW, WW and FPCW are equally weight (e.g., the Weight row), which note is relative to determination of an aggregate final weighted priority by the determination component 416, to be described further below. In one or more other embodiments, varied weightings for the different individual weighted priorities 520 considered can be employed and/or only one, two and/or other individual weighted priorities 520 can be employed (e.g., on which a final weighted priority is based).

Based on the determined individual and/or aggregated weighted priorities, one or more of these priorities can be employed to determine $W_i$ relative to the Equation 2 below by the determination component 416. That is, the determination component 416 can employ a dynamic power capping formula as provided below at Equation 2, where V(Pc) is consolidated power cab to be adjusted amongst devices within priority class Pc, V is group (e.g., subset) power capacity, $W_i$ is weighted priority (e.g., individual and/or aggregated), and $P_i$ is population in each weighted priority (e.g., number of servers 434 in a weighted priority).

$$V(Pc) = \left[ (V * Pi * Wi) \bigg/ \sum_{i=1}^{N} (Pi * Wi) \right] \bigg/ (Pi). \quad \text{Equation 2}$$

As indicated above, the $W_i$ value can be based on an individual weighted priority 520 (e.g., the server efficiency weighted priority 522, workload weighted priority 524, future power consumption weighted priority 526) and/or on an aggregate of two or more such individual weighted priorities 520.

In one or more embodiments, steps of the derivation can be communicated to a user entity, such as visually illustrated at a visualization component operably coupled to the dynamic power capping system 402.

With reference to Table 4 and Equation 2, considering and continuing the above-describe example, the determination component 416 can utilize Equation 2 for each of the servers to determine individual V(Pc)'s.

First, the weighted priority $W_i$ can be determined as rankings in a range equal to the number of Pc's (e.g., servers). Thus, in the example, the range is from 1-5. More than one server can have the same ranking. For example, looking to Table 4 again, the WP column can be determined based on the aggregated Score column. The resulting server $W_i$'s at T1 are S1=2, S2=3, S3=4, S4=5 and S5=5.

In the example, at T1, $P_i$ is 1 for each of $W_i$'s of 2, 3 and 4. $P_i$ is w for the $W_i$ of 5, because two servers are in this weighted priority $W_i$.

Power capacity available at T1 for the full subset of the five servers S1-S5 is 1700 KW, for the example.

Accordingly, based on Equation 2, the following results are provided:

S1=[(1700*2*1)/(5*2+4*1+3*1+2*1)]/1=178.95 KW;
S2=[(1700*3*1)/(5*2+4*1+3*1+2*1)]/1=268.42 KW;
S3=[(1700*4*1))/(5*2+4*1+3*1+2*1)]/1=357.89 KW;
S4=[(1700*5*2))/(5*2+4*1+3*1+2*1)/2]/2=894.73/2=447.37 KW; and
S5=[(1700*5*2))/(5*2+4*1+3*1+2*1)/2]/2=894.73/2=447.37 KW.

Likewise, the same power distribution determinations can be determined at other time intervals T2 and T3.

Turning next to the execution component 418, this component can generally employ an allocation of power determined by the determination component 416 for one or more servers 434, such as for one or more individual servers 434 of a subset 430 of servers. This employment can comprise direction to, instruction to, communication to and/or the like to the respective server system 428 (e.g., to a respective administrator node, individual node controller, subset controller and/or the like). That is, the execution component 418 can apply the dynamic power cap determined by the determination component 416 to power different individual servers 434 with non-equal distributions of power (again noting that the servers 434 can be grouped at a subset 430 or plural subsets 430).

It will further be appreciated that the aforementioned processes can be repeated based on newly obtained data, such as, but not limited to, new workload characterization data, such as obtained by the obtaining component 412.

For example, the evaluation component 414 can re-group at least one server 434 of a subset 430 into another subset 430, such as based on re-deriving of at least one respective weighted priority for the at least one server 434. This re-derivation can be performed at a specified frequency of time and/or upon notification from the obtaining component 412 of newly available data, such as absent notification from a user entity/administrator entity external to the dynamic power capping system 402. An administrator entity, user entity and/or default setting can determine the specified frequency of time.

For another example, the determination component 416, such as based on the re-grouping, can re-determine the power cap for the subset 430 of servers 434, resulting in a re-determined power cap. This can be performed at a specified frequency of time and/or upon notification from the evaluation component 414 of a newly available individual weighted priority and/or other suitable priority ranking, such as absent notification from a user entity/administrator entity external to the dynamic power capping system 402. An administrator entity, user entity and/or default setting can determine the specified frequency of time.

For yet another example, the execution component 418 can re-allocate power to the subset 430. This can be performed at a specified frequency of time and/or upon notification from the determination component 416 of a newly available power allocation determination, such as absent notification from a user entity/administrator entity external to the dynamic power capping system 402. An administrator entity, user entity and/or default setting can determine the specified frequency of time.

In one or more embodiments, the dynamic power capping system 402 can comprise an analytical model 420. The analytical model 420 can be, can comprise and/or can be comprised by a classical model, such as a predictive model, neural network, and/or artificial intelligent model. An artificial intelligent model and/or neural network (e.g., a convolutional network and/or deep neural network) can comprise and/or employ artificial intelligence (AI), machine learning (ML), and/or deep learning (DL), where the learning can be supervised, semi-supervised, self-supervised, semi-self-supervised and/or unsupervised. For example, the analytical model 420 can comprise an ML model.

The analytical model 420 generally can accordingly evaluate known data, such as historical data from an external source and/or newly available (e.g., real-time data) as discussed above. In one or more cases, the analytical model 420 can aid the evaluation component 414 and/or the determination component 416 in determining a ranking system for quantifying fuzzy-based data, deriving an individual weighted priority, deriving a final weighted priority, and/or deriving an aggregated weighted priority.

Alternatively, it will be appreciated that the dynamic power capping system 402 can function absent use of the analytical model 420.

Generally, the analytical model 420 can be trained, such as by a training component 424, on a set of training data that can represent the type of data for which the system 402 will be used. That is, the analytical model 420 can be trained on historical and/or current data comprising vendor benchmark data, component classification data, telemetry data, predefined static workload rankings, timescale based ranking data, power use data, performance data, key performance indicator (KPI) data, operation data and/or the like.

Example Operations

Figure 6:
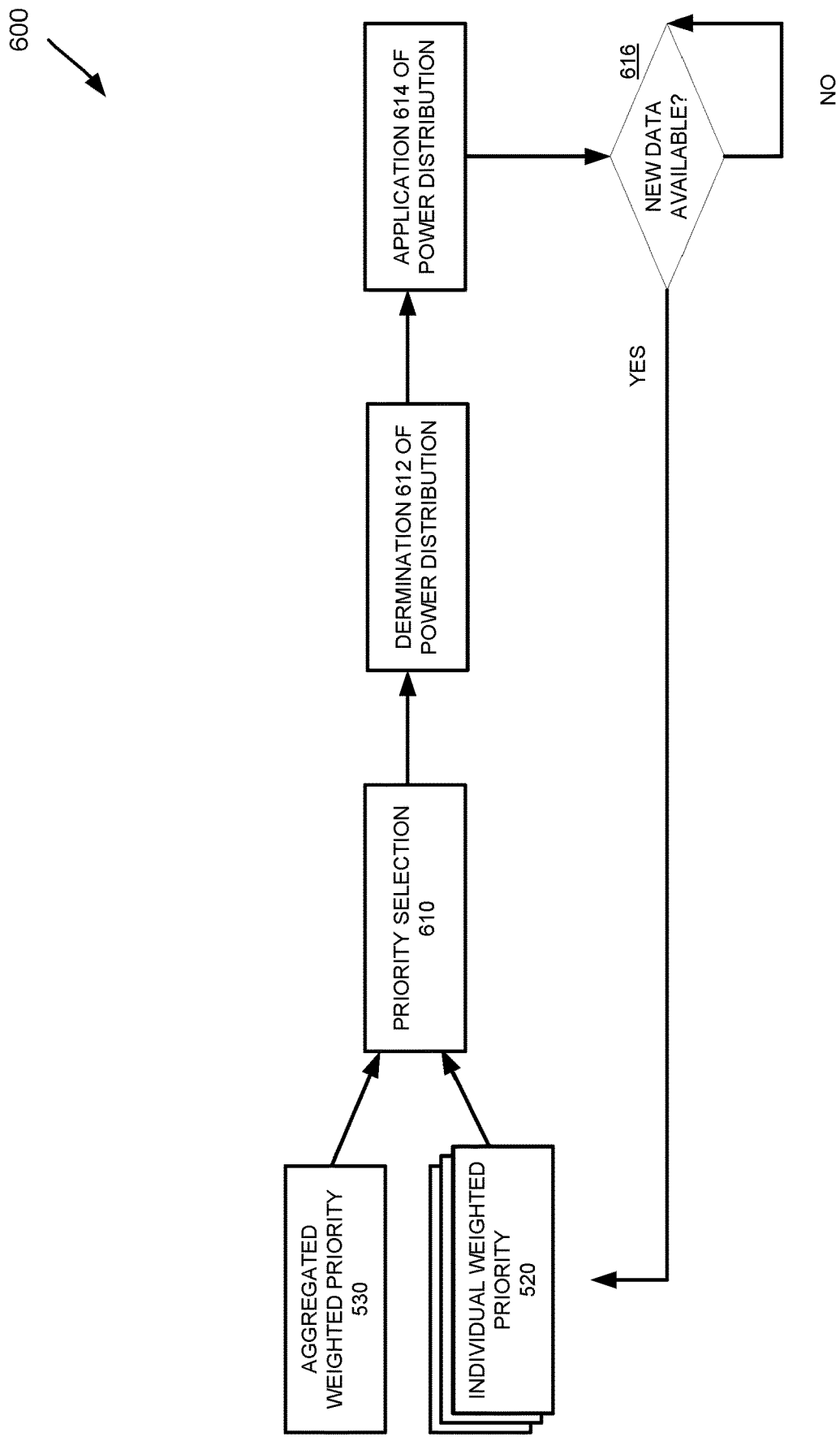
FIG. 6 illustrates yet another process flow diagram of one or more processes, inputs and/or outputs of the dynamic power capping system of FIG. 4, in accordance with one or more embodiments and/or implementations described herein.

Referring now briefly to FIG. 6, an example process flow 600 is illustrated as a summary of one or more processes, inputs and/or outputs of the dynamic power capping system 402. As illustrated, aggregated weighted priority 530 and/or individual weighted priority(ies) can be employed (e.g., by the determination component 416) to make a priority selection 610 upon which a determination 612 of power distribution will be based. Based on the determination 612 of power distribution derived by the determination component 416, the execution component 418 can perform an application 614 of power distribution (direction to, instruction to, communication to and/or the like to the respective server system 428). The dynamic power capping system 402 can continue to determine, such as by the evaluation component 414, at a decision step 616, whether new data is available. Where new data is not available, the decision step 616 can be repeated at a suitable frequency, as described above. Where new data is available (e.g., any of the aforementioned data comprising vendor benchmark data, component classification data, telemetry data, predefined static workload rankings, time-scale based ranking data, power use data, performance data, key performance indicator (KPI) data, operation data and/or the like, without being limited thereto), individual weighted priorities 520 and/or aggregated weighted priorities 530 can be re-derived (e.g., by the evaluation component 414).

Additional Example Operations

Figure 8:
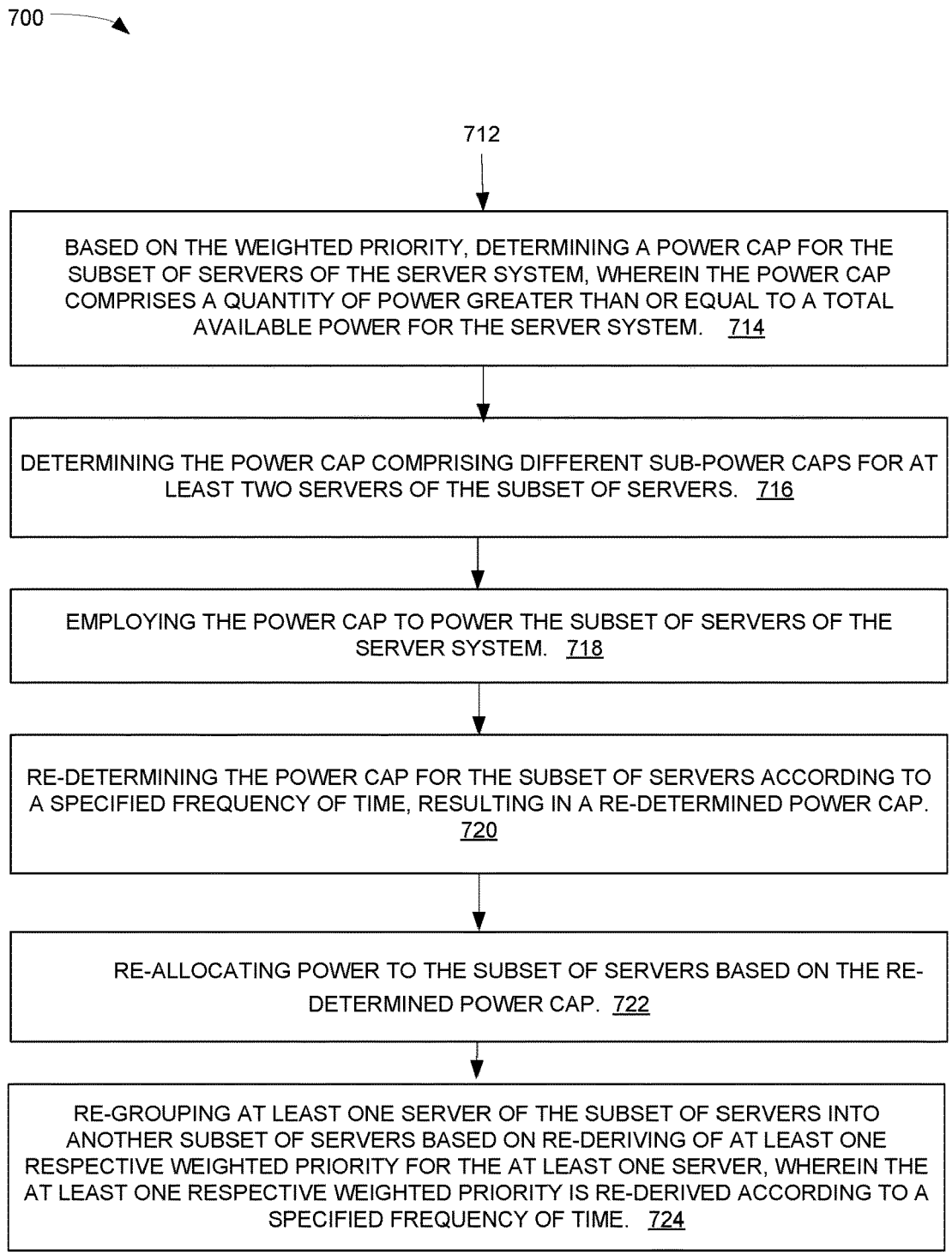
FIG. 8 illustrates a continuation of the process flow diagram of FIG. 7 of a method of dynamic power capping at a server system, in accordance with one or more embodiments and/or implementations described herein.

Turning now to FIGS. 7 and 8, a process flow comprising a set of operations for determining dynamic power capping is set forth relative to FIGS. 1-6. One or more elements, objects and/or components referenced in the process flow 700 can be those of schematics 100-600. Repetitive description of like elements and/or processes employed in respective embodiments is omitted for sake of brevity.

At operation 702, the process flow 700 can comprise grouping, by a system operatively coupled to a processor (e.g., evaluation component 414), servers of a server system into a subset of servers of the server system, based on at least one of impact data representative of a business impact or time data representative of a predicted turn-around time of at least one workload being executed at the server system.

At operation 704, the process flow 700 can comprise obtaining, by the system (e.g., obtaining component 412), parameter data, telemetry data, and operation data for a subset of servers of a server system.

At operation 706, the process flow 700 can comprise deriving, by the system (e.g., evaluation component 414), a weighted priority for a server of the subset of servers of the server system.

At operation 708, the process flow 700 can comprise deriving, by the system (e.g., evaluation component 414), the weighted priority based on a determination of workload priority at the subset of servers, the workload priority being determined based on telemetry data for the subset of servers that is collected during execution of at least one workload at the subset of servers.

At operation 710, the process flow 700 can comprise deriving, by the system (e.g., evaluation component 414), the weighted priority based on a determination of an efficiency value representative of an efficiency of the subset of servers, wherein the efficiency data is determined based on current condition data representative of current operation conditions for the subset of servers as compared to historical condition data representative of historical operation conditions for the subset of servers.

At operation 712, the process flow 700 can comprise deriving, by the system (e.g., evaluation component 414), the weighted priority based on a predicted power consumption data representative of a prediction of future power consumption for the subset of servers, wherein the predicted power consumption data is determined using a time-series regression-based machine learning model.

At operation 714, the process flow 700 can comprise based on the weighted priority, determining, by the system (e.g., determination component 416), a power cap for the subset of servers of the server system, wherein the power cap comprises a quantity of power less than or equal to a total available power for the server system.

At operation 716, the process flow 700 can comprise determining, by the system (e.g., determination component 416) the power cap comprising different sub-power caps for at least two servers of the subset of servers.

At operation 718, the process flow 700 can comprise employing, by the system (e.g., execution component 418), the power cap to power the subset of servers of the server system.

At operation 720, the process flow 700 can comprise, re-determining, by the system (e.g., determination component 416), the power cap for the subset of servers according to a specified frequency of time, resulting in a re-determined power cap.

At operation 722, the process flow 700 can comprise, re-allocating, by the system (e.g., execution component 418), power to the subset of servers based on the re-determined power cap.

At operation 724, the process flow 700 can comprise re-grouping, by the system (e.g., evaluation component 414), at least one server of the subset of servers into another subset of servers based on re-deriving of at least one respective weighted priority for the at least one server, wherein the at least one respective weighted priority is re-derived according to a specified frequency of time.

For simplicity of explanation, the computer-implemented methodologies and/or processes provided herein are depicted and/or described as a series of acts. The subject innovation is not limited by the acts illustrated and/or by the order of acts, for example acts can occur in one or more orders and/or concurrently, and with other acts not presented and described herein. The operations of process flows of the FIGS. provided herein are example operations, and there can be one or more embodiments that implement more or fewer operations than are depicted.

Furthermore, not all illustrated acts can be utilized to implement the computer-implemented methodologies in accordance with the described subject matter. In addition, the computer-implemented methodologies could alternatively be represented as a series of interrelated states via a state diagram or events. Additionally, the computer-implemented methodologies described hereinafter and throughout this specification are capable of being stored on an article of manufacture to facilitate transporting and transferring the computer-implemented methodologies to computers. The term article of manufacture, as used herein, is intended to encompass a computer program accessible from any machine-readable device or storage media.

In summary, technology described herein relates to dynamic adjustment of power capping for one or more servers of a subset of servers of a server system. A method can comprise generating, by a system operatively coupled to a processor, for a first server subset of a server system, weighted average values comprising a first weighted average value of current workload priority at the first server subset, a second weighted average value of current performance efficiency of the first server subset, and a third weighted average value of predicted future power usage for the first server subset, ranking, by the system, the first server subset as compared to a second server subset of the server system that does not overlap servers with the first server subset, wherein the ranking is based on at least one of the weighted average values, and applying, by the system, a power cap to the first server subset based on the ranking.

An advantage of one or more of the above-indicated method, system and/or non-transitory computer-readable medium can be dynamically adjustable power capping based on changes in workload characterization at one or more servers of the subset of servers. This can be accomplished on a per-server basis, such as with or without adjusting overall subset power capacity, as compared to a total available power capacity for the full server system. Indeed, non-equal distribution of power to servers, such as servers having one or more same priorities, can be accomplished, such as based on the current workload characterization. That is, power allocation is not limited to a preset minimum of settings, such as high, medium, and low power capacities.

Another advantage of one or more of the above-indicated method, system and/or non-transitory computer-readable medium can be setting of dynamically adjustable priorities upon which the power capping can be based. That is, as opposed to defined static priorities (e.g., high, medium, and low), full variation of priority ranking, such as any number between a range of 0 to 10 for example, can be employed to fully, dynamically vary the priorities, and thus achieve greater correspondence with a dynamic power cap employed based, such as based on current workload characterization. In this way, power can be directed towards servers, and thus workloads at such servers, having actual demand, as compared to predicted and/or static demand, based on operational analysis and forecasting.

Yet another advantage of one or more of the above-indicated method, system and/or non-transitory computer-readable medium can be lack of reliance on human intervention for the dynamically adjustable power capping, and thus prevention of human error. Likewise, another advantage can be lack of use of a predictive access limitation method that can undesirably provide both false negative non-limitations and false positive limitations.

Furthermore, ability to automatically, dynamically manage power allocation across plural servers of a server system, based on non-static priorities and staying within total available power can provide advantages for a provider of a server system, such as comprising, but not being limited to, increase in use of the server system by customer entities and/or increase in awareness of the server system by customer entities.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein are inherently and/or inextricably tied to computer technology and cannot be implemented outside of a computing environment. For example, one or more processes performed by one or more embodiments described herein can more efficiently, and even more feasibly, provide program and/or program instruction execution related to power capping for a server system based on dynamically changing parameters, telemetry data, workloads and/or the like, as compared to existing systems and/or techniques. Systems, computer-implemented methods and/or computer program products facilitating performance of these processes are of great utility in the fields of server system power allocation and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively evaluate data, based on the evaluation derive weighted priorities, based on the weighted priorities adjust a power allocation of a subset of servers of a server system, and/or apply the power allocation at the server system as the one or more embodiments described herein can facilitate these processes. And, neither can the human mind nor a human with pen and paper automatically perform one or more of the processes as conducted by one or more embodiments described herein.

In one or more embodiments, one or more of the processes described herein can be performed by one or more specialized computers (e.g., a specialized processing unit, a specialized classical computer, and/or another type of specialized computer) to execute defined tasks related to the one or more technologies describe above. One or more embodiments described herein and/or components thereof can be employed to solve new problems that arise through advancements in technologies mentioned above, employment of cloud computing systems, computer architecture and/or another technology.

One or more embodiments described herein can be fully operational towards performing one or more other functions (e.g., fully powered on, fully executed and/or another function) while also performing the one or more operations described herein.

Example Operating Environment

Figure 9:
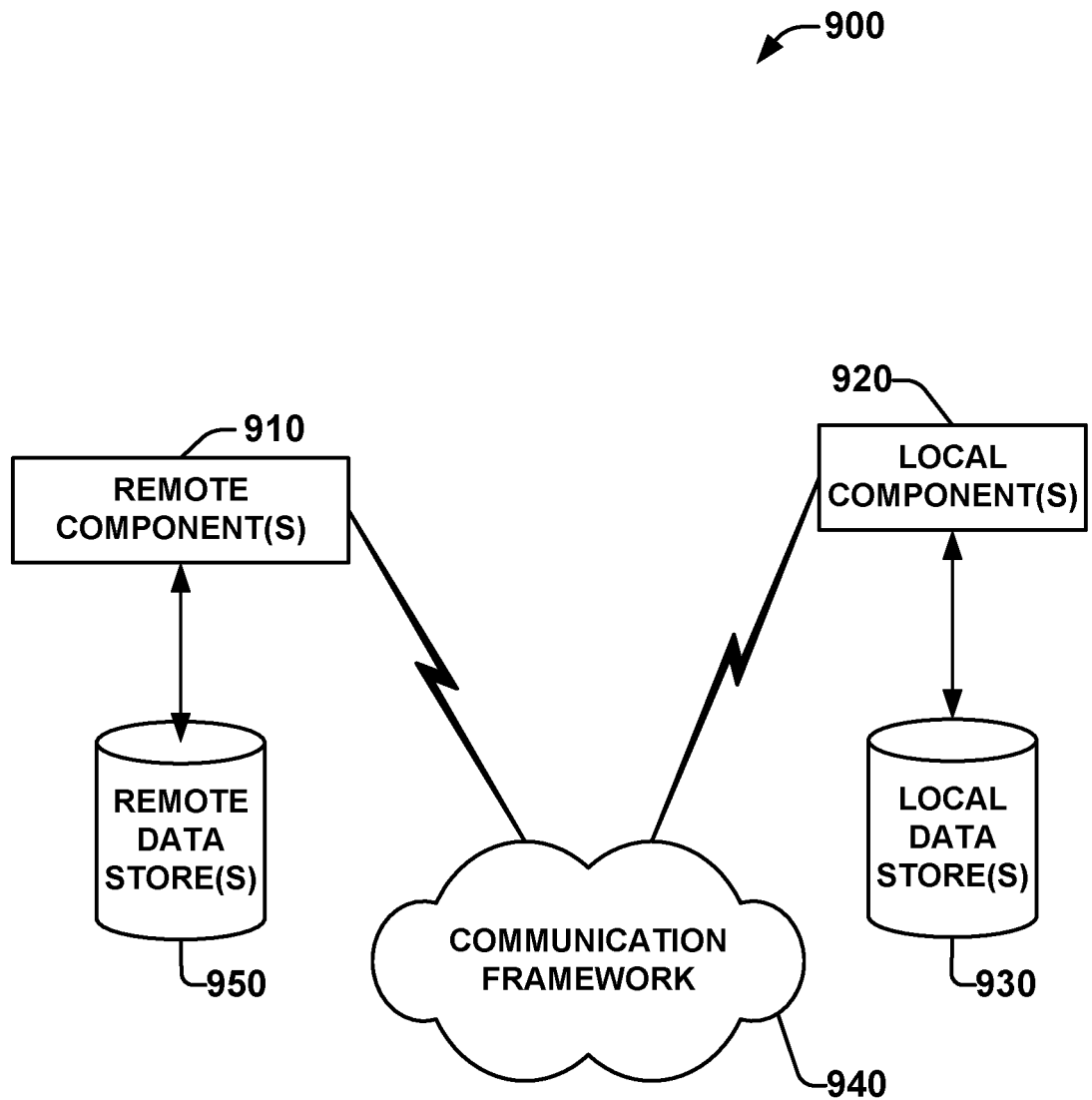
FIG. 9 illustrates a block diagram of an example operating environment into which embodiments of the subject matter described herein can be incorporated.

FIG. 9 is a schematic block diagram of an operating environment 900 with which the described subject matter can interact. The operating environment 900 comprises one or more remote component(s) 910. The remote component(s) 910 can be hardware and/or software (e.g., threads, processes, computing devices). In one or more embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The operating environment 900 also comprises one or more local component(s) 920. The local component(s) 920 can be hardware and/or software (e.g., threads, processes, computing devices). In one or more embodiments, local component(s) 920 can comprise an automatic scaling component and/or programs that communicate/use the remote resources 910 and 920, etc., connected to a remotely located distributed computing system via communication framework 940.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The operating environment 900 comprises a communication framework 940 that can be employed to facilitate communications between the remote component(s) 910 and the local component(s) 920, and can comprise an air interface, e.g., interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Example Computing Environment

Figure 10:
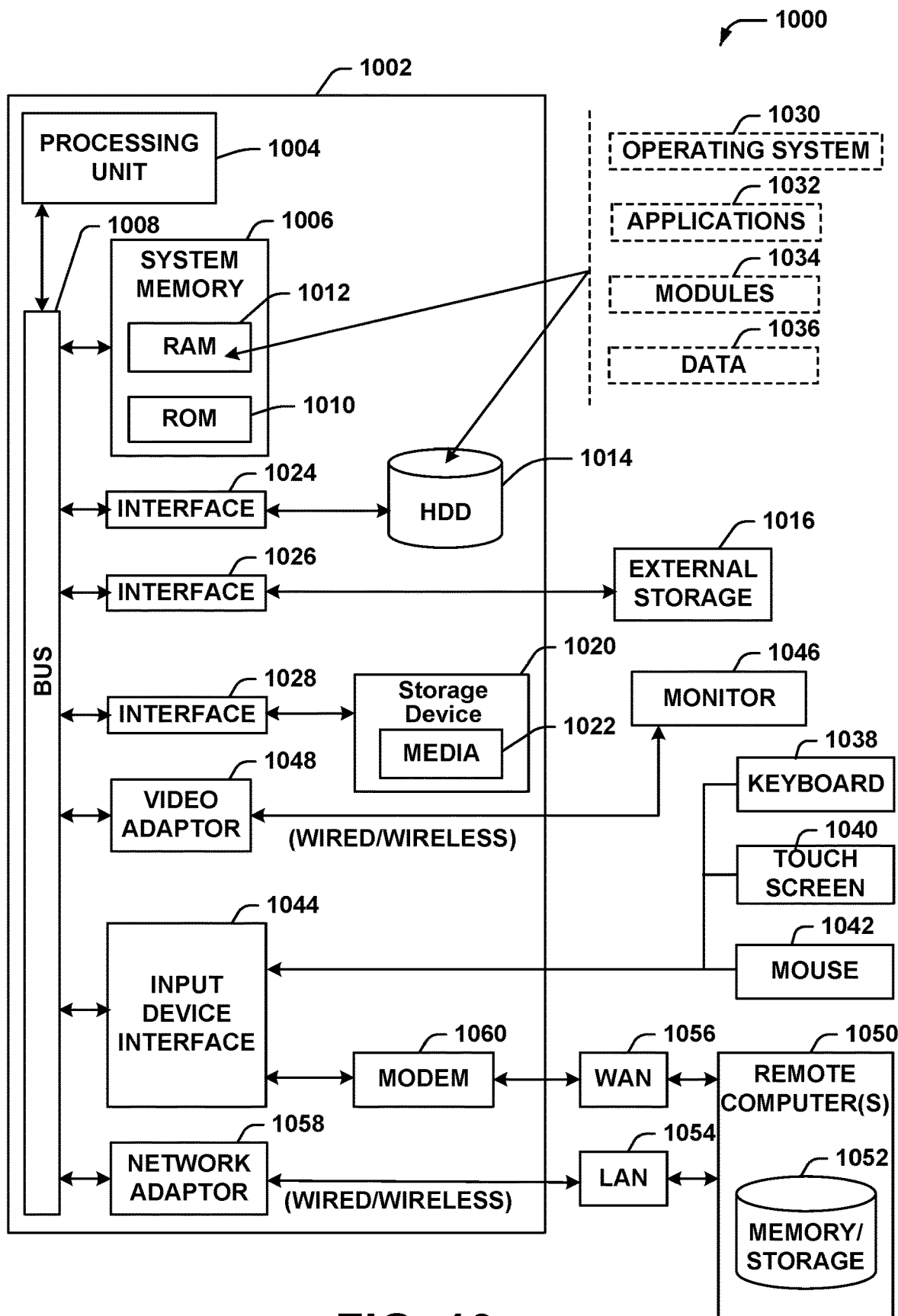
FIG. 10 illustrates an example schematic block diagram of a computing environment with which the subject matter described herein can interact and/or be implemented at least in part, in accordance with one or more embodiments and/or implementations described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Referring still to FIG. 10, the example computing environment 1000 which can implement one or more embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), and can include one or more external storage devices 1016 (e.g., a magnetic floppy disk drive (FDD) 1016, a memory stick or flash drive reader, a memory card reader, etc.). While the internal HDD 1014 is illustrated as located within the computer 1002, the internal HDD 1014 can also be configured for external use in a suitable chassis (not shown). Additionally, while not shown in computing environment 1000, a solid-state drive (SSD) could be used in addition to, or in place of, an HDD 1014.

Other internal or external storage can include at least one other storage device 1020 with storage media 1022 (e.g., a solid-state storage device, a nonvolatile memory device, and/or an optical disk drive that can read or write from removable media such as a CD-ROM disc, a DVD, a BD, etc.). The external storage 1016 can be facilitated by a network virtual machine. The HDD 1014, external storage device(s) 1016 and storage device (e.g., drive) 1020 can be connected to the system bus 1008 by an HDD interface 1024, an external storage interface 1026 and a drive interface 1028, respectively.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. The network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Conclusion

The above description of illustrated embodiments of the one or more embodiments described herein, comprising what is described in the Abstract, is not intended to be exhaustive or to limit the described embodiments to the precise forms described. While one or more specific embodiments and examples are described herein for illustrative purposes, various modifications are possible that are considered within the scope of such embodiments and examples, as those skilled in the relevant art can recognize.

In this regard, while the described subject matter has been described in connection with various embodiments and corresponding figures, where applicable, other similar embodiments can be used or modifications and additions can be made to the described embodiments for performing the same, similar, alternative, or substitute function of the described subject matter without deviating therefrom. Therefore, the described subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures to optimize space usage or enhance performance of user equipment. A processor can also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of these instances.

While the embodiments are susceptible to various modifications and alternative constructions, certain illustrated implementations thereof are shown in the drawings and have been described above in detail. However, there is no intention to limit the various embodiments to the one or more specific forms described, but on the contrary, the intention is to cover all modifications, alternative constructions, and equivalents falling within the spirit and scope.

In addition to the various implementations described herein, other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be implemented across a plurality of devices. Accordingly, the various embodiments are not to be limited to any single implementation, but rather are to be construed in breadth, spirit, and scope in accordance with the appended claims.

What is claimed is:

1. A system, comprising:
   at least one processor; and
   at least one memory that stores executable instructions that, when executed by the at least one processor, facilitate performance of operations, comprising:
   deriving a non-pre-categorized, weighted priority for a server, of a subset of servers of a server system;
   based on the non-pre-categorized, weighted priority for the server, determining a first power cap for the subset of servers of the server system, wherein the first power cap comprises a quantity of power less than or equal to a total available power for the server system;
   employing the first power cap to power the subset of servers of the server system,
   wherein the first power cap applies only to a first range of time over which one or more workloads are to be executed at the first server subset; and
   applying a second power cap to the first server subset based on a second range of time over which the one or more workloads are to be executed.

2. The system of claim 1, wherein the operations executed by the processor further comprise:
   re-determining the first power cap for the subset of servers according to a specified frequency of time, resulting in a re-determined first power cap; and
   re-allocating power to the subset of servers based on the re-determined first power cap.

3. The system of claim 1, wherein the operations executed by the processor further comprise:
   re-grouping at least one server of the subset of servers into another subset of servers based on re-deriving of at least one respective weighted priority for the at least one server, wherein the at least one respective weighted priority is re-derived according to a specified frequency of time.

4. The system of claim 1, wherein the operations executed by the processor further comprise:
   grouping the server of the servers of the server system into the subset of servers based on at least one of impact data representative of a business impact or time data representative of a predicted turn-around time of at least one workload being executed at the server.

5. The system of claim 1, wherein the deriving of the non-pre-categorized, weighted priority comprises:
   deriving the non-pre-categorized, weighted priority based on a determination of workload priority at the subset of servers, the workload priority being determined based on telemetry data for the subset of servers that is collected during execution of at least one workload at the subset of servers.

6. The system of claim 1, wherein the deriving of the non-pre-categorized, weighted priority comprises:
   deriving the non-pre-categorized, weighted priority based on a determination of an efficiency value representative of an efficiency of the subset of servers, wherein the efficiency data is determined based on current condition data representative of current operating conditions for the subset of servers as compared to historical condition data representative of historical operating conditions for the subset of servers.

7. The system of claim 1, wherein the deriving of the non-pre-categorized, weighted priority comprises:
   deriving the non-pre-categorized, weighted priority based on predicted power consumption data representative of a prediction of future power consumption for the subset of servers, wherein the predicted power consumption data is determined using a time-series regression-based machine learning model.

8. A non-transitory machine-readable medium, comprising executable instructions that, when executed by at least one processor facilitate performance of operations, comprising:
   determining a workload ranking for a first subset of servers of a server system based on telemetry data for the first subset of servers that is collected during execution of one or more workloads at the first subset of servers;
   modifying the workload ranking based on a timescale-based ranking applicable to a range of time over which the one or more workloads are to be executed, the modifying resulting in a modified workload ranking;
   determining a workload priority for the first subset of servers based on the modified workload ranking;
   aggregating a first ranking of the first subset of servers based on the workload priority and a second ranking of the first subset of servers based on an efficiency for the first subset of servers, based on current operating conditions for the first subset of servers as compared to historical operating conditions for the first subset of servers, the aggregating resulting in a first aggregated ranking; and applying a power cap to the first subset of servers based on the first aggregated ranking.

9. The non-transitory machine-readable medium of claim 8, wherein the operations executed by the at least one processor further comprise:

determining the power cap for the first subset of servers further in response to an application of a corresponding second aggregated ranking of a second subset of servers of the server system.

10. The non-transitory machine-readable medium of claim 9, wherein the operations executed by the at least one processor further comprise:

further determining the power cap for the first subset of servers, being a first power cap, in response to a determination of a second power cap for the second subset of servers based on the corresponding second aggregated ranking.

11. The non-transitory machine-readable medium of claim 8, wherein the operations executed by the at least one processor further comprise determining the power cap to be a non-pre-categorized amount that is less than or equal to a total available power for the server system.

12. The non-transitory machine-readable medium of claim 8, wherein the operations executed by the at least one processor further comprise:

determining a prediction of future power consumption for the first subset of servers, wherein the determining of the prediction of future power consumption for the first subset of servers employs a time-series regression-based machine learning model; and determining the power cap for the first subset of servers based on the prediction.

13. The non-transitory machine-readable medium of claim 12, wherein the operations executed by the at least one processor further comprise:

determining the prediction of future power consumption based at least partially on historical temporal variations in power usage of the first subset of servers.

14. The non-transitory machine-readable medium of claim 8, wherein the power cap is a first power cap,
wherein the range of time is a first range of time,
wherein the first power cap applies only to the first range of time, and
wherein the operations executed by the at least one processor further comprise:
applying a second power cap to the subset of servers based on a second modified workload priority for the subset of servers as modified based on a second range of time over which the one or more workloads are to be executed.

15. A method, comprising:

generating, by a system operatively coupled to at least one processor, for a first server subset of a server system, weighted average values comprising a first weighted average value of current workload priority at the first server subset, a second weighted average value of current performance efficiency of the first server subset, and a third weighted average value of predicted future power usage for the first server subset;

ranking, by the system, the first server subset as compared to a second server subset of the server system, wherein the second server subset does not overlap servers with the first server subset, and wherein the ranking is based on a comparison of at least one of the weighted average values to a corresponding weighted average value of the second server subset;

determining, by the system, a first power cap for the first server subset based on the comparison, wherein the first power cap applies only to a first range of time over which one or more workloads are to be executed at the first server subset; and applying a second power cap to the first server subset based on a second range of time over which the one or more workloads are to be executed.

16. The method of claim 15, further comprising:

generating, by the system, a design matrix comprising current and historical observations of power consumption of the first server subset ordered by time;

generating, by the system, an autoregressive moving average model using the design matrix; and deriving, by the system, the weighted average value of predicted future power usage for the first server subset using the autoregressive moving average model.

17. The method of claim 15, wherein the applying of the first power cap comprises determining the first power cap to be less than or equal to total available power for the server system.

18. The method of claim 15, wherein the generating comprises:

generating the first weighted average value of the current workload priority at the first server subset based on current telemetry data for the first server subset comprising processor utilization telemetry data indicative of processor utilization by the first server subset, bandwidth telemetry data indicative of bandwidth to process workloads by the first server subset and memory telemetry data indicative of memory usage by the first server subset.

19. The method of claim 15, wherein the generating comprises:

generating the second weighted average value of the current performance efficiency of the first server subset based on current operating conditions for the first server subset as compared to historical operating conditions for the first server subset.

20. The method of claim 15, further comprising:

re-ranking, by the system, the first server subset as compared to the second server subset, at a specified frequency of time;

updating, by the system, the first power cap based on the re-ranking, resulting in a revised first power cap; and applying, by the system, the revised first power cap to the first server subset.

* * * * *